United States Patent
Bohac

[15] 3,682,454
[45] Aug. 8, 1972

[54] QUICK RELEASE COUPLING DEVICE FOR CUTTING OR WELDING TORCHES

[72] Inventor: Johann Armin Josef Bohac, Lidingö, Sweden

[73] Assignee: AGA Aktiebolag, Lidingo, Sweden

[22] Filed: Feb. 4, 1970

[21] Appl. No.: 8,528

[30] Foreign Application Priority Data

Feb. 4, 1969 Sweden ..................... 1437/69

[52] U.S. Cl. ................... 266/23 T, 279/38, 285/322, 285/419
[51] Int. Cl. ........................................... B23k 7/10
[58] Field of Search ........ 279/1 B, 35, 38, 39, 40, 36, 279/37, 89, 90, 106, 108; 285/419, 373, 322, 35, 320; 266/23 P, 23 T

[56] References Cited

UNITED STATES PATENTS

| | | |
|---|---|---|
| 2,657,650 | 11/1953 | Chouinard et al. ....266/23 P X |
| 714,266 | 11/1902 | Vogel .................... 285/322 X |
| 3,024,051 | 3/1962 | Hullinger ................ 279/37 X |
| 757,929 | 4/1904 | Huhsman .............. 285/322 X |
| 2,654,135 | 10/1953 | Grizzard et al. ......... 279/38 X |
| 1,043,806 | 11/1912 | Dahl ..................... 285/373 X |
| 2,607,404 | 8/1952 | Osterlind .............. 285/320 X |

Primary Examiner—Andrew R. Juhasz
Assistant Examiner—James F. Coan
Attorney—Larson and Taylor

[57] ABSTRACT

A quick release coupling device for mounting a torch head on the body of a welding or cutting torch includes pivotable gripping jaws mounted on an internally threaded sleeve or nut which screws onto the torch body. In operation, the gripping jaws are pivoted inwardly into a position wherein inwardly extending shoulders thereof surround and engage an external shoulder on the torch head, the mounting sleeve then being tightened onto the torch body so that positive, secure gripping of the torch head is effected.

3 Claims, 4 Drawing Figures

PATENTED AUG 8 1972　　3,682,454

INVENTOR
JOHANN ARMIN JOSEF BOHAC

BY *Larson and Taylor*
ATTORNEYS 3,682,454

QUICK RELEASE COUPLING DEVICE FOR CUTTING OR WELDING TORCHES

FIELD OF THE INVENTION

The present invention relates to an improved quick release coupling device for mounting a torch head onto a welding or cutting torch.

BACKGROUND OF THE INVENTION

Standard welding and cutting devices wherein a combustible gas from a mixing chamber issues out of a nozzle conventionally include replaceable torch heads through which the gas is conducted. An important requirement for a mounting or coupling device for use in coupling the torch head to a body portion of such a welding or cutting torch is that the device should permit ready exchange of one torch head for another, in that different operating conditions may require different torch head sizes and different angular relationships between the gas nozzle and the torch body. Further, whereas the coupling device must permit simple and rapid exchange of one torch head for another, the device must also be safe and hence must provide a secure, positive coupling action, in that the connection between the torch head and torch body or handle must be perfectly gas-tight.

One prior art coupling device used for this purpose includes a simple pivotable bracket mounted on a nut or internally threaded sleeve adapted to be screwed onto the body of the torch, the bracket engaging a flange or shoulder on the torch head (see, for example, Swedish patent 139,856). In use, the torch head is inserted into the body of the torch and the bracket is pivoted into a position in which an inwardly extending generally C-shaped portion thereof fits around the torch head and lateral surfaces of this portion engage the shoulder of the torch head, the nut then being tightened on the torch body so that the bracket firmly engages the torch head. It will be appreciated that because the C-shaped portion of the bracket pivots into the locking position thereof and fits around the shaft of the torch head, there must be a space or gap between the arms thereof to permit receipt of the torch head therebetween. It will also be appreciated that this space or gap may permit the torch head to slip out of engagement with the coupling device unless the mounting sleeve or nut has been very securely tightened on the torch body. Because of this such a device is entirely inadequate from a safety standpoint. A further disadvantage of such a device is that when a torch is not mounted in the torch body the bracket may pivot or swing over to a position wherein the closed side of the C-shaped portion of bracket faces inwardly. Under these circumstances, the bracket will have to be pivoted back into a position wherein the open side of the C-shaped portion faces inwardly before the torch head can be properly coupled to the torch body. It will be appreciated that annoying delays may thus be encountered in using the coupling device in question particularly where an operator inserts the torch head into the torch body without noticing that the bracket is on the wrong side in that he must then remove the torch head, reposition the bracket and then reinsert the torch head. A further disadvantage of a mounting device of this type is that the elements thereof are difficult to manufacture and require high precision machining.

SUMMARY OF THE INVENTION

In accordance with the invention, the disadvantages of the prior art are overcome through the provision of a coupling device which includes at least first and second gripping portions or members which together surround the entire circumference of the outer shoulder or flange of the torch head and hence provide positive, secure gripping of the head.

In accordance with a presently preferred embodiment, first and second gripping portions of the device are pivotably mounted on a mounting nut or sleeve which screws onto the torch body. The fact that the gripping portions entirely surround the shoulder of the torch eliminates unintentional loosening of the gripping portions from the torch head even where the mounting nut is not fully screwed onto the torch body and, consequently, eliminates the dangers associated with inadvertent separation of the torch head from the torch body. The coupling device of the invention also provides rapid disconnection of the torch head from the torch body by merely turning the mounting nut a few turns so that the gripping members can be separated. Among the other features of the invention, the gripping members form a socket-like or sleeve-like configuration in surrounding the shoulder of the torch head which is capable of withstanding relatively large mechanical stresses, the coupling device being particularly adapted for use in a torch apparatus in other respects as well. Further, the construction of the various elements of the quick release coupling device of the invention permits simple and ready manufacture of the device and enables automatic tools to be utilized.

Other features and advantages of the present invention will be set forth in or apparent from the detailed description of a preferred embodiment found hereinbelow.

DESCRIPTION OF THE PREFERRED EMBODIMENTS

Figure 1:
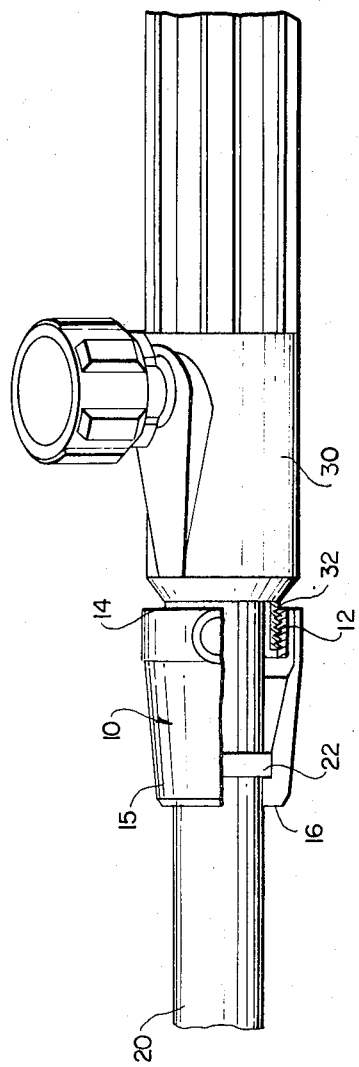
FIG. 1 is a side elevational view in partial section of a gas welding or cutting torch incorporating a coupling device in accordance with the invention.
Figure 2:
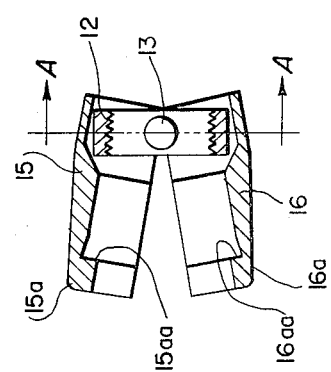
FIG. 2 is a longitudinal section of the coupling device of FIG. 1 shown in the unlocking or release portion thereof.

Referring to FIG. 1, a coupling device 10 serves to couple a torch head 20 onto a torch body 30. Both torch head 20 and torch body 30 are of conventional construction and further description thereof apart from the manner in which they cooperate with coupling device 10 is deemed unnecessary. Coupling device 10 includes an annular sleeve or nut 12 which is internally threaded to permit device 10 to be screwed onto an outwardly extending, externally threaded portion 32 of torch body 30. First and second screws or pins 13 and 14 (see FIG. 3) serve in pivotably mounting first and second gripping members or jaws 15 and 16 onto mounting nut 12. Gripping members 15 and 16 include inwardly extending shoulder or flange portions 15a and 16a (see FIG. 2) which, in the locking position of coupling device 10 shown in FIG. 1, engage the external shoulder or flange 22 of torch head 20 (only partially shown).

Figure 3:
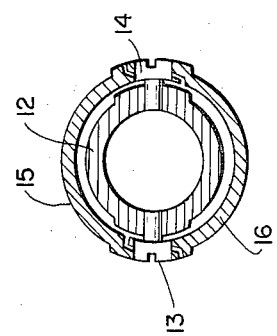
FIG. 3 is a sectional view taken generally along lines A—A of FIG. 2.

As shown in FIG. 3, gripping members 15 and 16 are positioned and arranged such that, on the side of mounting nut 12 in which screw 13 is received, the portion of gripping member 16 adjacent nut 12 is positioned inwardly of the corresponding portion of gripping member 15, whereas on the other side of nut 12, the portion of gripping member 16 adjacent nut 12 is positioned outwardly of the corresponding portion of gripping member 15. This arrangement greatly simplifies the manufacture of gripping members 15 and 16 so that they may be made identical to one another or, stated differently, only one shape of gripping member needs to be produced.

In operation, torch head 20 is inserted into an opening (not shown) in torch body 30 so that the end portion thereof abuts with an internal portion of body 30 which defines the passageways for gas from the mixing chamber, and quick release coupling device 10 is loosely threaded onto the outwardly extending portion 32 of torch body 30. At this time, the gripping members 15 and 16 are pivoted from the unlocking or release position shown in FIG. 2 into a locking position wherein the end surfaces contact the shaft of torch head 20. Actual locking is provided by tightening of mounting nut 12 onto member 32 so that the lateral interior surfaces (denoted 15aa and 16aa) of shoulders 15a and 16a positively and securely engage the shoulder 22 of torch head 20. Under these conditions torch head 20 is securely affixed to torch body 30 and cannot be separated therefrom without unscrewing nut 12 a few turns so that gripping members 15 and 16 can be disengaged from shoulder 22.

Figure 4:
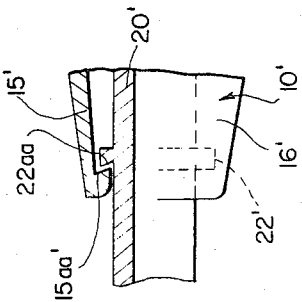
FIG. 4 is a side elevational view in partial section, similar to FIG. 1, of a further embodiment of the invention.

Referring to FIG. 4, a further embodiment of the invention is shown. The embodiment of FIG. 4 is quite similar to that of FIG. 1 and corresponding elements have been given the same numbers with primes attached. In FIG. 4, the gripping surfaces 15aa' and 16aa' of gripping members 15' and 16' are inclined and engage the reciprocally inclined surface 22aa of flange 22' of torch head 20'. This arrangement provides more positive gripping between the coupling device 10 and torch head 20 but at the cost of requiring additional turning of mounting nut 12 to disengage torch head 20 from device 10.

It will be appreciated that the coupling device described hereinabove may be modified in a number of further ways without departing from the scope and spirit of the invention. For example, gripping members 15 and 16 can be further subdivided into additional members corresponding to members 15 and 16 mounted on mounting ring 12.

I claim:

1. A quick release coupling device for attaching a torch head, including an external flange portion, to the body of a torch, said arrangement comprising an internally threaded ring for engaging the torch body and a gripping device pivotably mounted on said ring including means for engaging the external flange portion of the torch head, said gripping device including at least first and second pivotable gripping members movable between locking and unlocking positions, said members, in the locking positions thereof, substantially surrounding the external flange portion of the torch head, said gripping members cooperating to form a socket-like arrangement in the locking positions thereof and each said gripping member including an inwardly extending shoulder portion, the shoulder portions of said gripping members forming a complete annulus in the locking position of the gripping members.

2. A coupling device as claimed in claim 1 wherein said substantially identical gripping members comprise first and second gripping jaws, said device further including first and second pin members about which said gripping jaws are pivoted, each of said pin members extending through both of said gripping jaws and a portion of said first gripping jaw adjacent said first pin member lying inwardly of said second gripping jaw and a portion of said first gripping jaw adjacent said second pin member lying outwardly of said second gripping jaw.

3. A coupling device as claimed in claim 2 wherein the lateral surfaces of the inwardly extending shoulder portions of said gripping members are inclined and cooperate with a reciprocally inclined lateral surface of the flange portion of the torch head.

* * * * *